(12) United States Patent
Salter et al.

(10) Patent No.: US 12,545,138 B2
(45) Date of Patent: Feb. 10, 2026

(54) SYSTEMS AND METHODS FOR PREPARING ELECTRIFIED VEHICLES TO TRANSFER ENERGY

(71) Applicant: FORD GLOBAL TECHNOLOGIES, LLC, Dearborn, MI (US)

(72) Inventors: Stuart C. Salter, White Lake, MI (US); Ryan O'Gorman, Beverly Hills, MI (US); Alexander Avila, Birmingham, MI (US); Victoria Powers, Chicago, IL (US); Timothy Harris, Grosse Ile, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 820 days.

(21) Appl. No.: 17/849,849

(22) Filed: Jun. 27, 2022

(65) Prior Publication Data

US 2023/0415602 A1 Dec. 28, 2023

(51) Int. Cl.
| | | |
|---|---|---|
| *B60L 53/63* | (2019.01) | |
| *B60L 53/62* | (2019.01) | |
| *B60L 53/66* | (2019.01) | |
| *G01W 1/10* | (2006.01) | |
| *H02J 3/00* | (2006.01) | |
| *H02J 3/14* | (2006.01) | |

(52) U.S. Cl.
CPC ............. *B60L 53/63* (2019.02); *B60L 53/62* (2019.02); *B60L 53/66* (2019.02); *G01W 1/10* (2013.01); *H02J 3/003* (2020.01); *H02J 3/144* (2020.01)

(58) Field of Classification Search
CPC .......... B60L 53/63; B60L 53/62; B60L 53/66; H02J 3/003; H02J 3/144; G01W 1/10
USPC .......................................................... 320/109
See application file for complete search history.

(56) References Cited

U.S. PATENT DOCUMENTS

| | | | |
|---|---|---|---|
| 7,747,739 B2 | 6/2010 | Bridges et al. | |
| 8,278,881 B2 | 10/2012 | Woody et al. | |
| 8,872,379 B2 | 10/2014 | Ruiz et al. | |

(Continued)

FOREIGN PATENT DOCUMENTS

| | | |
|---|---|---|
| CN | 102163853 A | 8/2011 |
| IN | 106408134 A | 2/2017 |

OTHER PUBLICATIONS

Xia, Jingyi, et al., Research on Power Grid Resilience and Power Supply Restoration during Disasters—A Review; Published: Nov. 15, 2020; DOI: 10.5772/intechopen.94514 https://www.intechopen.com/chapters/73982.

*Primary Examiner* — Suresh Memula
(74) *Attorney, Agent, or Firm* — David B. Kelley; Carlson, Gaskey & Olds, P.C.

(57) ABSTRACT

Systems and methods are disclosed for preparing electrified vehicles to transfer energy to other structures. Weather related data and/or grid related data may be leveraged for predicting the likelihood of power outage conditions of a grid power source. When power outage conditions are predicted as being likely, the electrified vehicle may automatically enter a readiness state for transferring power to the structure without any time delays once an actual power outage condition occurs. Entering the readiness state may include steps such as waking up the electrified vehicle, initiating communications with electric vehicle supply equipment (EVSE), completing vehicle pre-checks, pre-charging certain power transfer system components, etc.

20 Claims, 5 Drawing Sheets

(56) References Cited

U.S. PATENT DOCUMENTS

| | | | |
|---|---|---|---|
| 9,024,744 B2 | 5/2015 | Klose et al. | |
| 9,440,549 B2 * | 9/2016 | Reddy | B60L 53/30 |
| 11,733,427 B1 * | 8/2023 | Thielke | G06N 3/0442 |
| | | | 702/3 |
| 2015/0329008 A1 * | 11/2015 | Karlson | H01M 10/425 |
| | | | 320/134 |
| 2020/0130522 A1 | 4/2020 | Motohira | |
| 2020/0223422 A1 * | 7/2020 | Ye | B60K 6/485 |
| 2022/0379770 A1 * | 12/2022 | Salter | H02J 3/001 |
| 2023/0043446 A1 * | 2/2023 | Salter | B60L 53/60 |
| 2023/0094216 A1 * | 3/2023 | Diamond | B60L 53/665 |
| | | | 700/291 |
| 2023/0115083 A1 * | 4/2023 | Slutzky | B60L 53/14 |
| | | | 320/109 |
| 2023/0138447 A1 * | 5/2023 | Ko | H02J 7/0013 |
| | | | 320/134 |
| 2023/0208184 A1 * | 6/2023 | Bahei-Eldin | H02J 3/14 |
| | | | 320/109 |

* cited by examiner

SYSTEMS AND METHODS FOR PREPARING ELECTRIFIED VEHICLES TO TRANSFER ENERGY

TECHNICAL FIELD

This disclosure relates generally to electrified vehicles, and more particularly to systems and methods for preparing electrified vehicles to transfer energy to other structures.

BACKGROUND

Plug-in type electric vehicles include one or more charging interfaces for charging a traction battery pack. Plug-in vehicles are typically charged while parked at a charging station or some other utility power source. Plug-in vehicles can also be used to support household loads during electrical power outages.

SUMMARY

A bidirectional energy transfer system according to an exemplary aspect of the present disclosure includes, among other things, a vehicle power transfer system, and a control module programmed to automatically command the vehicle power transfer system to a backup power readiness state for transferring power in response to predicting that a power outage condition of a grid power source is likely.

In a further non-limiting embodiment of the foregoing system, the control module is programmed to predict that the power outage condition is likely based on weather related data received from a weather data server.

In a further non-limiting embodiment of either of the foregoing systems, the control module is programmed to predict that the power outage condition is likely based on data received from a grid announcement server associated with the grid power source.

In a further non-limiting embodiment of any of the foregoing systems, the control module is a component of an electrified vehicle that is equipped with the vehicle power transfer system and a traction battery pack.

In a further non-limiting embodiment of any of the foregoing systems, the control module is a component of a cloud-based storage system.

In a further non-limiting embodiment of any of the foregoing systems, an instruction for commanding the backup power readiness state is included as part of a vehicle preconditioning control strategy created by the control module in response to predicting that the power outage condition is likely.

In a further non-limiting embodiment of any of the foregoing systems, the control module is programmed to command the vehicle power transfer system to the backup power readiness state by precharging the vehicle power transfer system.

In a further non-limiting embodiment of any of the foregoing systems, the control module is further programmed to initiate communications between an electric vehicle supply equipment (EVSE) and an electrified vehicle that is equipped with the vehicle power transfer system.

In a further non-limiting embodiment of any of the foregoing systems, the control module is further programmed to command the transfer of the power from the vehicle power transfer system to a structure when an actual power outage of the grid power source occurs.

In a further non-limiting embodiment of any of the foregoing systems, the control module is further programmed to delay the backup power readiness state when a traction battery pack has an insufficient state of charge.

A method according to another exemplary aspect of the present disclosure includes, among other things, automatically commanding an electrified vehicle, via a control module of a bidirectional energy transfer system, to a backup power readiness state for transferring power to a structure when a power outage condition of a grid power source is predicted as being likely.

In a further non-limiting embodiment of the foregoing method, the control module is a component of the electrified vehicle.

In a further non-limiting embodiment of either of the foregoing methods, the control module is a component of a cloud-based server system or a component of the structure receiving the power from the electrified vehicle.

In a further non-limiting embodiment of any of the foregoing methods, automatically commanding the electrified vehicle to the backup power readiness state includes waking up the electrified vehicle.

In a further non-limiting embodiment of any of the foregoing methods, automatically commanding the electrified vehicle to the backup power readiness state includes initiating communications with an electric vehicle supply equipment (EVSE).

In a further non-limiting embodiment of any of the foregoing methods, automatically commanding the electrified vehicle to the backup power readiness state includes precharging a component of a vehicle power transfer system of the electrified vehicle.

In a further non-limiting embodiment of any of the foregoing methods, the method includes receiving weather related data from a weather data server or data from a grid announcement server; and predicting whether or not the power outage condition is likely based on the weather related data or the data from the grid announcement server.

In a further non-limiting embodiment of any of the foregoing methods, the method includes determining whether the electrified vehicle is located at the structure, determining whether the electrified vehicle is on-plug, and pairing the electrified vehicle with an electric vehicle supply equipment (EVSE) when the electrified vehicle is both located at the structure and is on-plug.

In a further non-limiting embodiment of any of the foregoing methods, the method includes determining whether the electrified vehicle is located at the structure, and pairing the electrified vehicle with an electric vehicle supply equipment (EVSE) when the electrified vehicle is not at the structure but is within a threshold distance from the structure.

In a further non-limiting embodiment of any of the foregoing methods, the method includes providing a visual alert when a status of the backup power readiness state changes.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to systems and methods for preparing electrified vehicles to transfer energy to other structures. Weather related data and/or grid related data may be leveraged for predicting the likelihood of power outage conditions of a grid power source. When power outage conditions are predicted as being likely, the electrified vehicle may automatically enter a readiness state for transferring power to the structure without any time delays once an actual power outage condition occurs. Entering the readiness state may include steps such as waking up the electrified vehicle, initiating communications with electric vehicle supply equipment (EVSE), completing vehicle pre-checks, precharging certain power transfer system components, etc. These and other features of this disclosure are discussed in greater detail in the following paragraphs of this detailed description.

Figure 1:
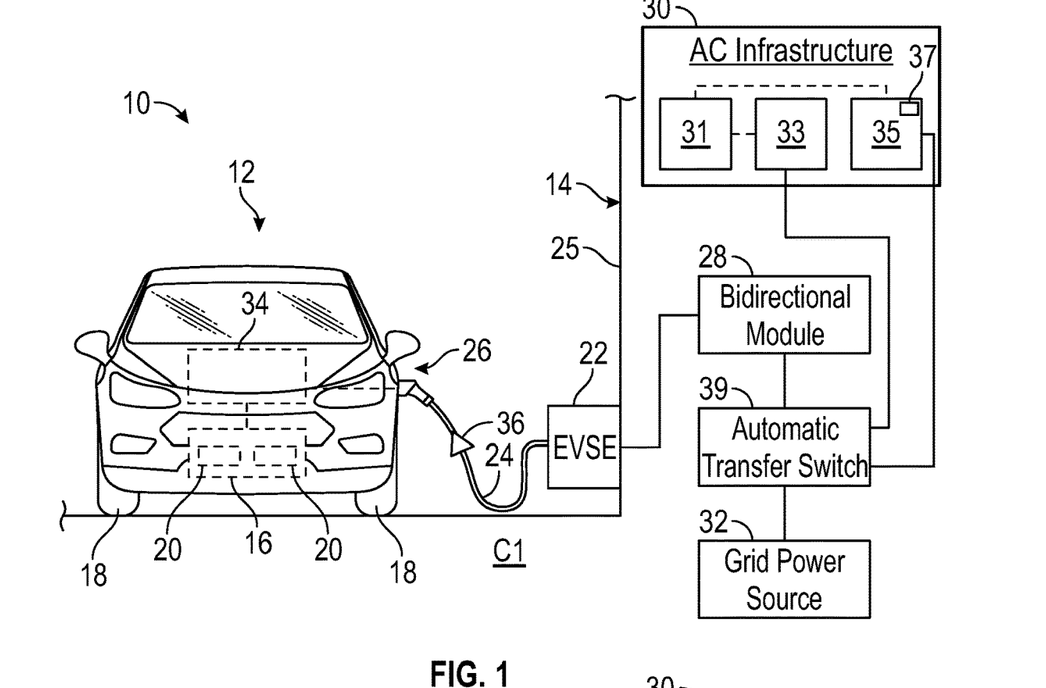
FIG. 1 schematically illustrates a first configuration of a bidirectional energy transfer system.
Figure 2:
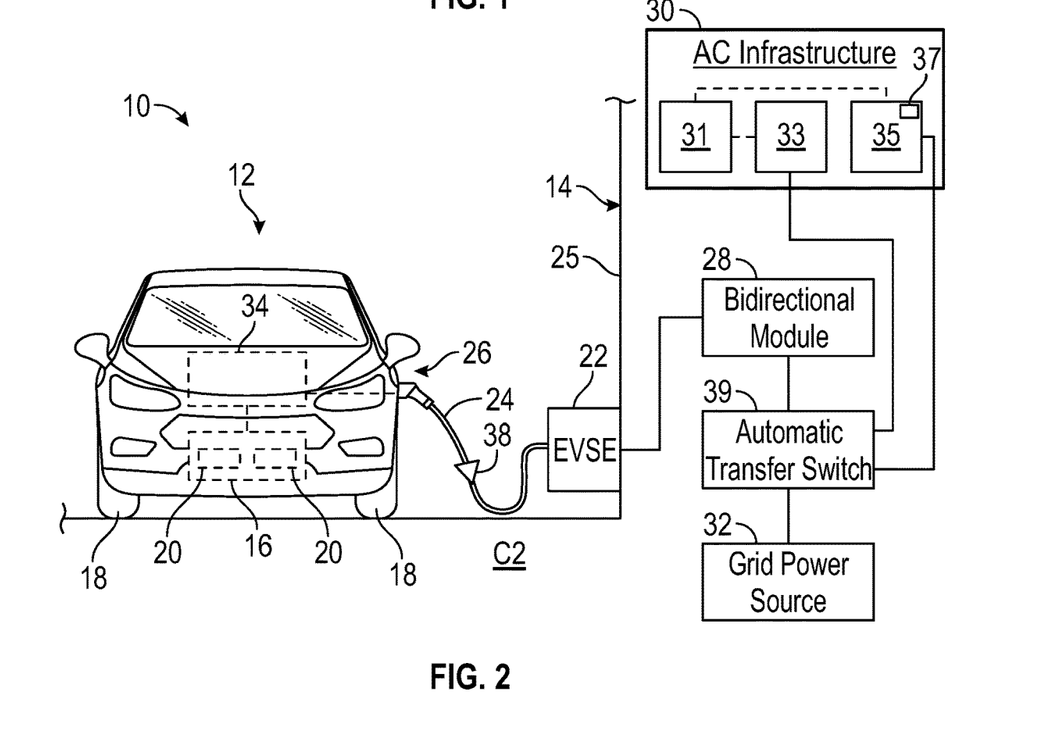
FIG. 2 schematically illustrates a second configuration of the bidirectional energy transfer system of FIG. 1.

FIGS. 1 and 2 schematically illustrate an exemplary bidirectional energy transfer system 10 (hereinafter "the system 10") for bidirectionally transferring energy between a vehicle 12 and a structure 14. The system 10 enables the bidirectional transfer of energy from the vehicle 12 to the structure 14 or vice versa. The structure 14 may be a residential building, a commercial building, a parking garage, a charging station, or any other type of structure that is capable of receiving or transferring energy. In an embodiment, the structure 14 is a residential household that functions as a "home location" of the vehicle 12.

Although a specific component relationship is illustrated in the figures of this disclosure, the illustrations are not intended to limit this disclosure. The placement and orientation of the various components of the depicted system are shown schematically and could vary within the scope of this disclosure. In addition, the various figures accompanying this disclosure are not necessarily drawn to scale, and some features may be exaggerated or minimized to emphasize certain details of a particular component.

In an embodiment, the vehicle 12 is a plug-in type electric vehicle (e.g., a plug-in hybrid electric vehicle (PHEV) or a battery electric vehicle (BEV)). The vehicle 12 includes a traction battery pack 16 that is part of an electrified powertrain capable of applying a torque from an electric machine (e.g., an electric motor) for driving wheels 18 of the vehicle 12. The electrified powertrain of the vehicle 12 may electrically propel the set of wheels 18 either with or without the assistance of an internal combustion engine.

The vehicle 12 of FIGS. 1-2 is schematically illustrated as a car. However, other vehicle configurations are also contemplated. The teachings of this disclosure may be applicable for any type of vehicle as the vehicle 12. For example, the vehicle 12 could be configured as a car, a pickup truck, a van, a sport utility vehicle (SUV), etc.

Although shown schematically, the traction battery pack 16 may be configured as a high voltage traction battery pack that includes a plurality of battery arrays 20 (e.g., battery assemblies or groupings of battery cells) capable of outputting electrical power to one or more electric machines of the vehicle 12. Other types of energy storage devices and/or output devices may also be used to electrically power the vehicle 12.

The vehicle 12 may interface with the structure 14 through an electric vehicle supply equipment (EVSE) 22 in order to perform the bidirectional energy transfers of the system 10. In an embodiment, the EVSE 22 is a wall box that may be mounted to a wall 25 of the structure 14. A charge cable 24 may operably connect the EVSE 22 to a charge port assembly 26 of the vehicle 12 for transferring energy between the vehicle 12 and the structure 14. The charge cable 24 may be configured to provide any level of charging (e.g., 120VAC, 240VAC, Direct Current (DC) charging, etc.).

The EVSE 22 may be operably connected to an AC infrastructure 30 of the structure 14 through a bidirectional energy transfer module 28. Although shown separately from the EVSE 22 in FIG. 1, the bidirectional energy transfer module 28 and the EVSE 22 could be integrated together as part of common module.

Various electrical loads 31, such as household appliance loads, for example, may be associated with the AC infrastructure 30. The electrical loads 31 may sometimes be referred to as transient loads of the AC infrastructure 30 and could include loads associated with common kitchen appliances, washers, dryers, water heaters, air conditioning units, furnaces, home alarms systems, sump pump systems, routers, etc.

The AC infrastructure 30 may further include a main service panel 33 and a backup load panel 35. The backup load panel 35 may include a power source 37 (e.g., a dark start battery) that is capable of providing a limited amount of backup power to certain components of the system 10 when power is unavailable from the main service panel 33, such as due to a grid power outage.

Power from a grid power source 32 (e.g., AC power, solar power, wind power, etc., or combinations thereof) and/or power from the vehicle 12 may be selectively transferred to the AC infrastructure 30 for powering the electrical loads 31. An automatic transfer switch 39 may be operably coupled to the grid power source 32. The automatic transfer switch 39 may be configured to automatically transfer the power supply from the grid power source 32 to a backup source provided from the vehicle 12 during outages of the grid power source 32 is detected. The automatic transfer switch 39 may therefore be controlled to selectively disconnect the AC infrastructure 30 from the grid power source 32 when certain grid conditions exist.

Power received from or transferred to the vehicle 12 may be transferred through the bidirectional energy transfer module 28. The bidirectional energy transfer module 28 is configured to aid bidirectional transfers of electrical energy between the vehicle 12 and the structure 14. The bidirectional energy transfer module 28 may include various equipment, including but not limited to an AC/DC converter, a common HVDC bus, an isolation transformer, a DC/AC inverter, a control module, etc. for configuring the structure 14 to either receive electrical energy from the vehicle 12 for supporting the electrical loads 31 or send electrical energy to the vehicle 12 for charging the traction battery pack 16.

The vehicle 12 may further include a vehicle power transfer system 34 configured for further enabling the bidirectional transfer of power between the vehicle 12 and the structure 14. The vehicle power transfer system 34 may be operably connected between the charge port assembly 26 and the traction battery pack 16 of the vehicle 12. The vehicle power transfer system 34 may include various equipment for enabling the vehicle 12 to act as a backup power source for transferring power to the structure 14, such as a charger, a converter, an inverter, HV relays or contactors, a motor controller (which may be referred to as an inverter system controller or ISC), etc. The vehicle power transfer system 34 may further be configured to enable the vehicle 12 to receive power from the structure 14 and for transferring energy between the traction battery pack 16 and one or more electric motors of the vehicle 12.

One non-limiting example of a suitable vehicle power transfer system that may be employed for use within the vehicle 12 for achieving bidirectional power transfers is disclosed within US Patent Publication No. 2020/0324665, assigned to Ford Global Technologies, LLC, the disclosure of which is incorporated herein by reference. However, other power transfer systems could also be utilized for achieving bidirectional power transfers within the scope of this disclosure.

FIG. 1 schematically illustrates a first configuration C1 of the system 10. During the first configuration C1, power may be transferred from the structure 14 to the vehicle 12, such as for charging the traction battery pack 16 of the vehicle 12. The direction of energy transfer during the first configuration C1 is schematically depicted by arrow 36.

FIG. 2 schematically illustrates a second configuration C2 of the system 10. During the second configuration C2, power may be transferred from the traction battery pack 16 of the vehicle 12 to the structure 14. The direction of energy transfer during the second configuration C2 is schematically illustrated by arrow 38. In this way, the vehicle 12 may be employed as a backup energy storage system for powering the electrical loads 31 of the structure 14, such as when power from the grid power source 32 is temporarily unavailable as a result of electrical blackouts, for example.

As an additional aspect of the system 10, the vehicle 12 may be strategically controlled in anticipation of power outages of the grid power source 32 in order to prepare or "precondition" the vehicle 12 for transferring power to the structure 14 for supporting the electrical loads 31, thereby reducing or even elimination any time delays for transferring the power once a power outage actually occurs. These and other aspects of the system 10 are further detailed below.

Figure 3:
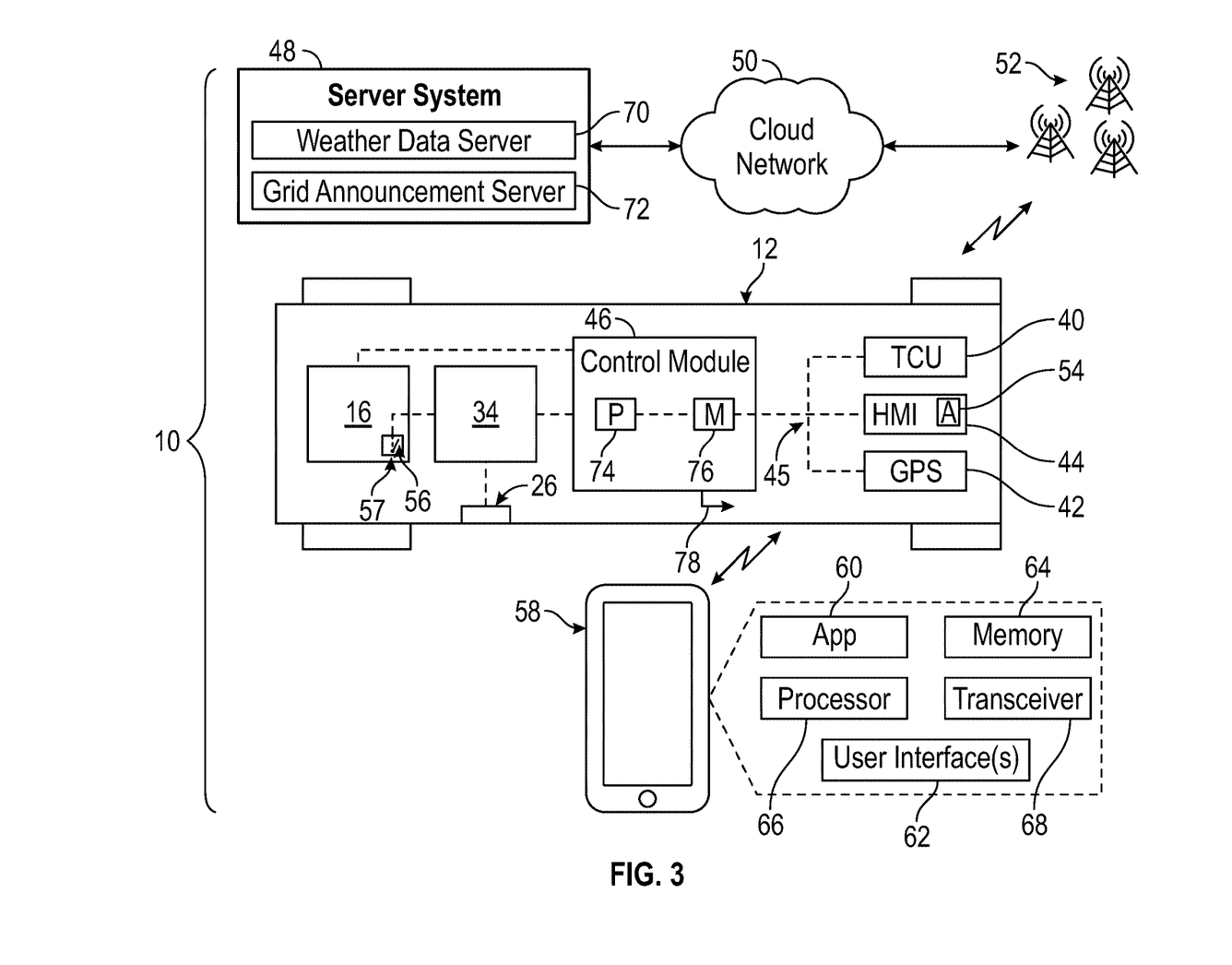
FIG. 3 schematically illustrates exemplary aspects of a bidirectional energy transfer system.

Additional aspects of the system 10 of FIGS. 1-2 are further detailed from the perspective of the vehicle 12 in FIG. 3. In particular, FIG. 3 schematically illustrates features that enable the system 10 to coordinate energy transfers from the vehicle 12 to the structure 14 based, at least in part, on predicted power outage conditions.

As further part of the system 10, the vehicle 12 may include a telecommunications module 40, a global positioning system (GPS) 42, a human machine interface (HMI) 44, and a control module 46. These and other components may be interconnected and in electronic communication with one another over a communication bus 45 of the vehicle 12. The communication bus 45 may be a wired communication bus such as a controller area network (CAN) bus, or a wireless communication bus such as Wi-Fi, Bluetooth®, Ultra-Wide Band (UWB), etc.

The telecommunications module 40 may be configured for achieving bidirectional communications with a cloud-based server system 48. The telecommunications module 40 may communicate over a cloud network 50 (e.g., the internet) to obtain various information stored on the server system 48 or to provide information to the server system 48 that can subsequently be accessed by the vehicle 12 (and/or other components of the system 10). The server system 48 can identify, collect, and store user data associated with the vehicle 12 for validation purposes. Upon an authorized request, data may be subsequently transmitted to the telecommunications module 40 via one or more cellular towers 52 or some other known communication technique (e.g., Wi-Fi, Bluetooth®, data connectivity, etc.). The telecommunications module 40 can receive data from the server system 48 or can communicate data back to the server system 48 via the cellular tower(s) 52. Although not necessarily shown or described in this highly schematic embodiment, numerous other components may enable bidirectional communications between the vehicle 12 and the server system 48.

The server system 48 may include various servers that store data that may be accessed by the system 10. In an embodiment, the server system 48 includes a weather data server 70 that stores weather related data. The weather related data may include, but is not limited to, weather history, current and forecasted windspeeds, current and forecasted rain fall, current and forecasted temperatures, current and forecasted barometric pressures, presence and/or likelihood of extreme weather (e.g., heat waves, tornados, hurricanes, heavy snow fall/blizzards, wild fires, torrential rain falls, etc.) for any given location. The weather data server 70 may be operated or managed, for example, by an organization such as the national weather service, or could include weather/climate related data collected from weather stations, news stations, remote connected temperature sensors, connected mobile device database tables, etc.

In another embodiment, the server system 48 includes a grid announcement server 72. The grid announcement server 72 may store data related to the grid power source 32. For example, the grid-related data could include announcements concerning scheduled blackouts and/or other grid-related announcements. The grid announcement server 72 may be operated or managed by the utility service provider associated with the grid power source 32 at the location of the vehicle 12 and/or the structure 14.

In a first embodiment, a user/owner of the vehicle 12 may interface with the server system 48 using the HMI 44. For example, the HMI 44 may be equipped with an application 54 (e.g., FordPass™ or another similar web-based application) for interfacing with the server system 48. The HMI 44 may be located within a passenger cabin of the vehicle 12 and may include various user interfaces for displaying information to the vehicle occupants and for allowing the vehicle occupants to enter information into the HMI 44. The vehicle occupants may interact with the user interfaces presentable on the HMI 44 via touch screens, tactile buttons, audible speech, speech synthesis, etc.

In another embodiment, the user/owner of the vehicle 12 could alternatively or additionally interface with the server system 48 for coordinating bidirectional energy transfers using a personal electronic device 58 (e.g., a smart phone, tablet, computer, wearable smart device, etc.). The personal electronic device 58 may include an application 60 (e.g., FordPass™ or another similar application) that includes programming to allow the user to employ one or more user interfaces 62 for setting or controlling certain aspects of the system 10. The application 60 may be stored in a memory 64 of the personal electronic device 58 and may be executed by a processor 66 of the personal electronic device 58. The personal electronic device 58 may additionally include a transceiver 68 that is configured to communicate with the server system 48 over the cellular tower(s) 52 or some other wireless link.

The GPS 42 is configured to pinpoint locational coordinates of the vehicle 12. The GPS 42 may utilize geopositioning techniques or any other satellite navigation techniques for estimating the geographic position of the vehicle 12 at any point in time. GPS data from the GPS 42 may be utilized to estimate how far away the vehicle 12 is currently located from the structure 14, for example.

The control module 46 may include both hardware and software and could be part of an overall vehicle control system, such as a vehicle system controller (VSC), or could alternatively be a stand-alone controller separate from the VSC. In an embodiment, the control module 46 is programmed with executable instructions for interfacing with and commanding operation of various components of the system 10. Although shown as separate modules within the highly schematic depiction of FIG. 3, the telecommunications module 40, the GPS 42, the HMI 44, and the control module 46 could be integrated together as part of common module of the vehicle 12.

The control module 46 may include a processor 74 and non-transitory memory 76 for executing various control strategies and modes associated with the system 10. The processor 74 can be a custom made or commercially available processor, a central processing unit (CPU), or generally any device for executing software instructions. The memory 76 can include any one or combination of volatile memory elements and/or nonvolatile memory elements.

The processor 74 may be operably coupled to the memory 76 and may be configured to execute one or more programs stored in the memory 76 of the control module 46 based on the various inputs received from other devices, such as the server system 48, the telecommunications module 40, the GPS 42, the HMI 44, the traction battery pack 16, the EVSE 22, the automatic transfer switch 39, etc. In an embodiment, the application 54 (e.g., FordPass™ or another similar application), which includes programming for allowing the vehicle user to employ one or more user interfaces within the HMI 44 for setting or controlling certain aspects of the system 10, may be stored in the memory 76 and may be executed by the processor 74 of the control module 46. Alternatively, the control module 46 may be configured to communicate and interface with the personal electronic device 58 for coordinating and/or executing certain aspects of the system 10.

The control module 46 may receive and process various inputs for predicting a potential power outage condition and executing a vehicle preconditioning control strategy 78 in response to the potential power outage conditions. The vehicle preconditioning control strategy 78 may include, among other information, instructions for commanding the vehicle 12 to a readiness state (e.g., a backup power readiness mode) for transferring power to the structure 14 without delay once an actual power outage condition occurs. Placing the vehicle 12 in the readiness state may include steps such as waking up the vehicle 12, initiating communications with the EVSE 22 (e.g., via the telecommunications module 40), completing vehicle pre-checks, precharging certain vehicle components (e.g., the vehicle power transfer system 34, etc.), etc. In an embodiment, the vehicle 12 is considered in the readiness state when the only action required to begin transferring power from the vehicle 12 to the structure 14 is the closing of one or more sets of contactors 56 of a contactor system 57 of the vehicle 12. The contactor system 57 may be a component of either the traction battery pack 16 or the vehicle power transfer system 34, for example.

In an embodiment, based at least on inputs from the weather data server 70, the control module 46 may predict the potential for a power outage condition of the grid power source 32. Predicting the potential for the power outage condition may include assessing the likelihood of occurrence of a power outage associated with the grid power source 32. The control module 46 may be programmed to predict the potential for the power outage condition based on the likelihood of severe weather at the location of the vehicle 12 and/or the structure 14, how soon the severe weather is predicted to arrive, and/or various other information from the weather data server 70. The prediction may further be based on historical weather logs, storm category information, etc.

The control module 46 may additionally predict the potential for the power outage condition of the grid power source 32 based on inputs from the grid announcement server 72. For example, the control module 46 may be programmed to infer the power outage condition based on scheduled blackout information received from the grid announcement server 72. The control module 46 may be further programmed to detect when an actual power outage condition occurs based on inputs from the grid announcement server 72.

Once a power outage condition is predicted, the control module 46 may receive various additional inputs that may be utilized when preparing and executing the vehicle preconditioning control strategy 78. One such input to the control module 46 may include location data of the vehicle 12 received from the GPS 42. Another input to the control module 46 may include a plug connection status signal from the charge port assembly 26 for indicating whether or not the vehicle 12 is "on-plug" (e.g., whether or not the charge cable 24 is currently plugged into the charge port assembly 26). Another input to the control module 46 may include a current state of charge (SOC) level of the traction battery pack 16. Yet another input to the control module 46 may include information concerning power availability at the structure 14 received from the grid announcement server 72. The control module 46 may be configured to automatically prepare and command that the vehicle preconditioning control strategy 78 be executed when the power outage condition of the grid power source 32 is predicted as being likely.

The actual instructions and readiness protocols included as part of the vehicle preconditioning control strategy 78 can vary depending on a current status of the vehicle 12. For example, in an embodiment, when the power outage condition is predicted as being likely and the vehicle 12 is currently either "off-plug" or away from the structure 14, the control module 46 may command the vehicle 12 to the readiness state by notifying the user of the vehicle of the likely power outage and requesting the user to plug-in the vehicle 12, precharging the vehicle power transfer system 34, commanding that wireless communications (e.g., pairing, etc.) be initiated between the vehicle 12 and the EVSE 22, commanding that all necessary vehicle pre-checks be performed, instructing the power source 37 of the backup load panel 35 to precharge the bidirectional energy transfer module 28, etc. If away from the structure 14 when the predicated power outage condition occurs, the control module 46 may further command that the wireless communications be initiated with the EVSE 22 only when the vehicle 12 is within a predefined distance (e.g., geofence) of the structure 14.

In another embodiment, when the power outage condition is predicted as being likely and the vehicle 12 is currently "on-plug" and either fully charged or waiting to charge, the control module 46 may command the vehicle 12 to the readiness state by notifying the user of the vehicle 12 of the likely power outage, and awakening and precharging all vehicle systems necessary for transferring power to the structure 14. The control module 46 may further command the flashing of vehicle caution lights or altering an appearance of the charge port assembly 26 (e.g., by changing colors, etc.) for visually indicating different states of readiness of the vehicle 12 for transferring power when the user has been detected within a predefined range of the vehicle 12. When the power outage condition is no longer predicted as being likely, the control module 46 may instruct the vehicle 12 to revert back to a normal operating state.

In yet another embodiment, when the power outage condition is predicted as being likely and the vehicle 12 is both on-plug and charging, the control module 46 may command the vehicle 12 to the readiness state by determining whether the current SOC of the traction battery pack 16 is of a sufficient threshold to support the electrical loads 31 of the structure 14 during the impending power outage. If so, the control module 46 may command the vehicle 12 to stop charging and set a pre-charge state, which can be visually indicated by flashing caution lights or altering an appearance of the charge port assembly 26. If the SOC of the traction battery pack 16 is insufficient to meaningfully support the electrical loads 31, the control module 46 may command the vehicle 12 to continue charging until a time that is closer to the time the power outage condition is expected to occur. Stated another way, the control module 46 may be configured to delay putting the vehicle 12 in the readiness state when it is determined that additional charging is necessary before the vehicle 12 can be used as a backup power source.

Figure 4:
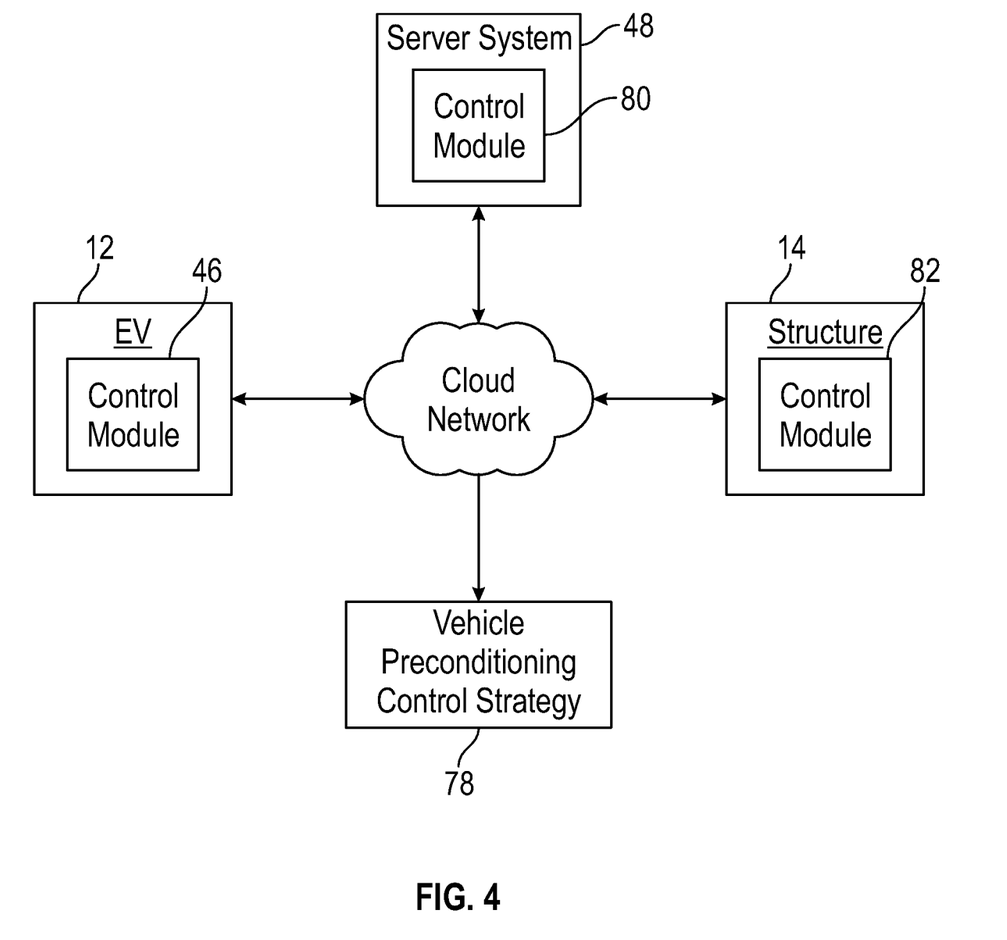
FIG. 4 schematically illustrates another exemplary bidirectional energy transfer system.

In the embodiments described above, the control module 46 of the vehicle 12 may be configured to function as the communications hub of the system 10. However, other embodiments are also contemplated within the scope of this disclosure. For example, as shown in FIG. 4, a control module 80 of the server system 48 (e.g., a cloud-based control module) and/or a control module 82 associated with the structure 14 could be configured to function as the communications hub of the system 10. In yet another embodiment, the respective control modules of each of the vehicle 12, the structure 14, and the server system 48 may operate together over the cloud network 50 to establish a control system for controlling the functionality of the system 10, such as for creating and executing the vehicle preconditioning control strategy 78 in order to place the vehicle 12 and other components of the system 10 in the backup power readiness state, for example.

Figure 5:
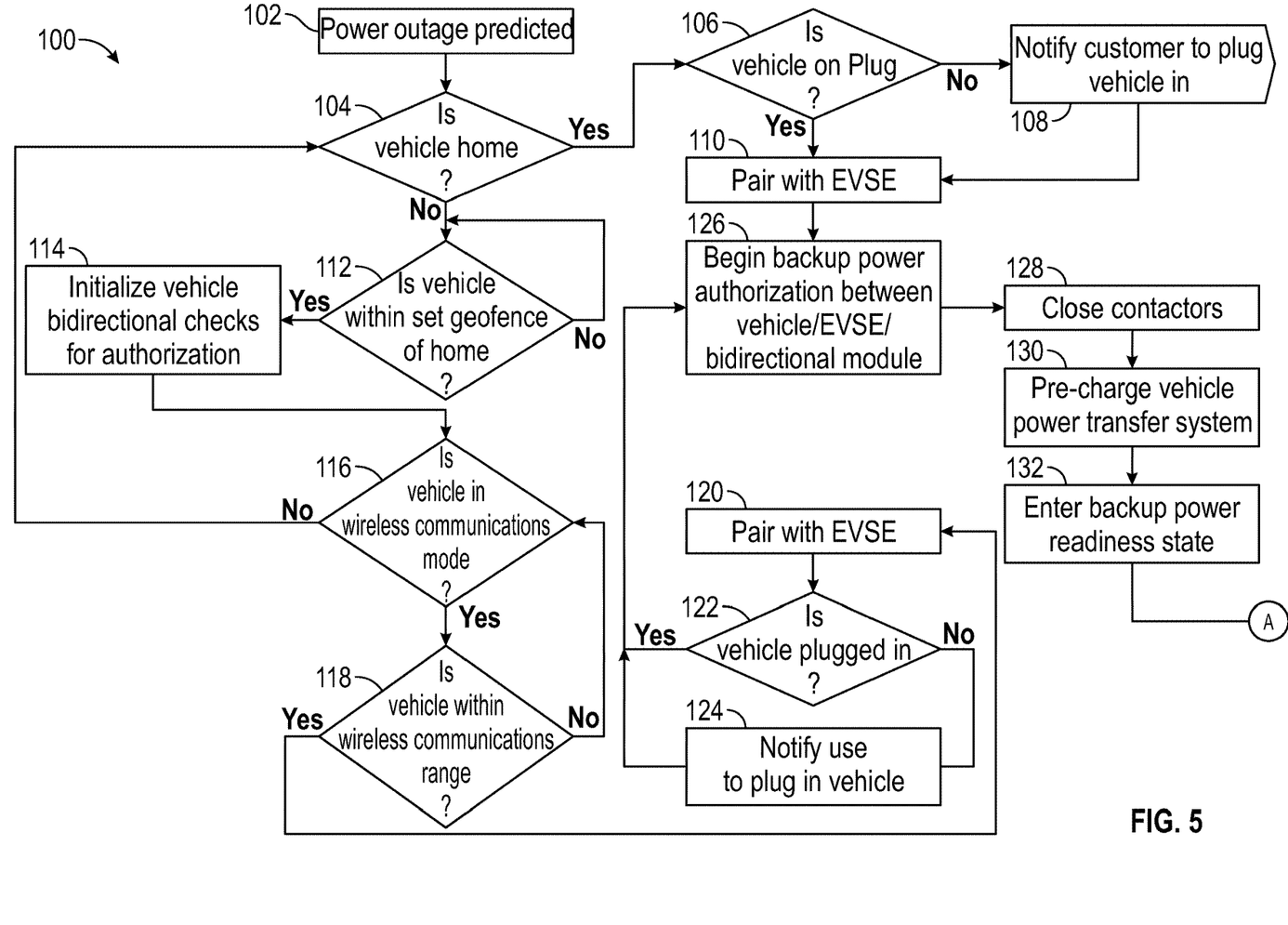
FIG. 5 is a flow chart of an exemplary method for coordinating and providing bidirectional energy transfer events in response to predicted and actual power outage conditions.

FIG. 5, with continued reference to FIGS. 1-4, schematically illustrates in flow chart form an exemplary method 100 for coordinating and executing backup power energy transfer events from the vehicle 12 to the structure 14. The system 10 may be configured to employ one or more algorithms adapted to execute at least a portion of the steps of the exemplary method 100. For example, the method 100 may be stored as executable instructions in the memory 76 of the control module 46, and the executable instructions may be embodied within any computer readable medium that can be executed by the processor 74 of the control module 46. The method 100 could alternatively or additionally be stored as executable instructions in the memories of the control module 80 of the server system 48 and/or the control module 82.

The exemplary method 100 may begin at block 102 when a power outage condition of the grid power source 32 is predicated as being likely. At block 104, the method 100 may determine whether the vehicle 12 is at its home location. In this embodiment, the home location of the vehicle 12 is assumed to be the structure 14. However, other embodiments are also contemplated within the scope of this disclosure.

If a YES flag is returned at block 104, the method 100 may proceed to block 106 by determining whether or not the vehicle 12 is on-plug (e.g., charge cable 24 is currently connected to the charge port assembly 26). If NO, the user of the vehicle 12 may be prompted to plug-in the vehicle 12 at block 108. From either block 106 or block 108, the vehicle 12 may then pair with the EVSE 22 at block 110.

The method 100 may alternatively proceed to block 112 from block 104 when a NO flag is returned, thus indicating the vehicle 12 is not currently located at the structure 14. At block 112, the method 100 may determine whether the vehicle 12 is currently located within a threshold distance of the structure 14 (e.g., within a set geofence relative to the structure 14). If YES, the method 100 may initiate vehicle bidirectional checks for authorization at block 114. This step may include, among various other things, initiating communications with the EVSE 22, for example.

Next, at block 116, the method 100 may determine whether the vehicle 12 is in a wireless communication mode. If NO, the method 100 may return to block 104. If YES, the method 100 may proceed to block 118 by confirming whether the vehicle 12 is within a wireless communication range of the structure 14. If YES, the vehicle 12 may pair with the EVSE 22 at block 120.

At block 122, the method 100 may again confirm whether or not the vehicle 12 is on-plug. If NO, the user of the vehicle 12 may be prompted to plug-in the vehicle 12 at block 124.

From any of blocks 110, 122, or 124, the method 100 may proceed to block 126 by beginning backup power authorization sequences between the vehicle 12, the EVSE 22, and the bidirectional energy transfer module 28. The contactors 56 of the contactor system 57 may be closed at block 128, and the vehicle power transfer system 34 may be precharged at block 130. The method 100 may then command to vehicle 12 to the backup power readiness state at block 132.

Next, at block 134, the method 100 may confirm whether or not the power from the grid power source 32 is stable. If NO, the automatic transfer switch 39 may be commanded to disconnect the AC infrastructure 30 from the grid power source at block 136. The method 100 may then begin transferring power from the vehicle 12 to the structure 14 at block 138.

The method 100 may alternatively proceed to block 140 when a YES flag is returned at block 134. At block 140, the method 100 may determine whether the vehicle 10 is operably connected to a DC charging system. If YES, the method 100 may couple the vehicle 12 to the DC charging system at block 142 and allow the vehicle 12 to be charged. This allows the vehicle 12 to easily and quickly switch from charging to discharging to reduce activation times.

Alternatively, if a NO flag is returned at block 140, the method 100 may proceed to block 144 by confirming whether the automatic transfer switch 39 is coupled to the grid power source 32. If YES, the vehicle 12 may begin transferring power to the structure 14 in parallel with the power received from the grid power source 32 at block 146.

This allows the vehicle 12 to more quickly and easily provide the power to the structure 14 alone when grid power is subsequently lost.

From any of blocks 138, 142, 144, or 146, the method 100 may proceed to block 148 by determining whether the predicted power outage alert has expired. If YES, the method 100 may proceed to block 150 by halting the energy transfer to the structure 14 and reverting the vehicle 12 back to a normal operation.

Alternatively, if a NO flag is returned at block 148, the method 100 may determine whether an actual power outage condition has occurred at block 152. If NO, the method 100 may return to block 134, and if YES, the method 100 may determine whether the structure 14 has a dark start power source 37 at block 154. If NO, the vehicle 12 may be immediately transitioned to backup power mode for transferring power to the structure 14 with minimal delay at block 156. If YES, the method 100 may first initialize power transfer from the power source 37 while the vehicle 12 continues to achieve its readiness state at block 158 prior to completing the method 100 at block 156 by providing the backup power to the structure 14.

The bidirectional energy transfer systems of this disclosure are designed to coordinate bidirectional energy transfer events between vehicles and structures based on predicted power outage conditions. The proposed systems facilitate reduced startup times for supplying backup power by leveraging power outage prediction methodologies. The proposed systems may thus respond to actual grid power outages in a time frame that is relatively close to the timing of stationary type backup power systems.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A bidirectional energy transfer system, comprising:
a vehicle power transfer system, and
a control module programmed to automatically command the vehicle power transfer system to a backup power readiness state for transferring power in response to a grid power outage prediction,
wherein the control module is programmed to command the vehicle power transfer system to the backup power readiness state by initiating communications between the vehicle power transfer system and an electric vehicle supply equipment (EVSE) that includes a charge cable operably connectable to a charge port assembly of an electrified vehicle that is equipped with the vehicle power transfer system.

2. The system as recited in claim 1, wherein the control module is programmed to infer the grid power outage prediction based on weather related data received from a weather data server.

3. The system as recited in claim 1, wherein the control module is programmed to infer the grid power outage prediction based on data received from a grid announcement server associated with a grid power source.

4. The system as recited in claim 1, wherein the control module is a component of an electrified vehicle that is equipped with the vehicle power transfer system and a traction battery pack.

5. The system as recited in claim 1, wherein the control module is a component of a cloud-based storage system.

6. The system as recited in claim 1, wherein an instruction for commanding the backup power readiness state is included as part of a vehicle preconditioning control strategy created by the control module in response to the grid power outage prediction.

7. The system as recited in claim 1, wherein the control module is programmed to command the vehicle power transfer system to the backup power readiness state by precharging the vehicle power transfer system.

8. The system as recited in claim 1, wherein the control module is further programmed to command the transfer of the power from the vehicle power transfer system to a structure when an actual power outage of a grid power source occurs.

9. The system as recited in claim 1, wherein the control module is further programmed to delay the backup power readiness state when a traction battery pack has an insufficient state of charge.

10. The system as recited in claim 1, wherein the vehicle power transfer system is considered to be in the backup power readiness state when the only action required to begin transferring power from the vehicle power transfer system is closing a set of contactors of a contactor system of the vehicle power transfer system.

11. The system as recited in claim 1, wherein the control module is programmed to notify a user of the electrified vehicle to plug the charge cable into the charge port assembly to prepare the vehicle power transfer system for entering the backup power readiness state.

12. A method, comprising:
automatically commanding an electrified vehicle, via a control module of a bidirectional energy transfer system, to a backup power readiness state for transferring power to a structure in response to a grid power outage prediction,
wherein automatically commanding the electrified vehicle to the backup power readiness state includes initiating communications between the electrified vehicle and an electric vehicle supply equipment (EVSE) that includes a charge cable operably connectable to a charge port assembly of the electrified vehicle.

13. The method as recited in claim 12, wherein the control module is a component of the electrified vehicle.

14. The method as recited in claim 12, wherein the control module is a component of a cloud-based server system or a component of the structure receiving the power from the electrified vehicle.

15. The method as recited in claim 12, wherein automatically commanding the electrified vehicle to the backup power readiness state includes waking up the electrified vehicle.

16. The method as recited in claim 12, wherein automatically commanding the electrified vehicle to the backup power readiness state includes precharging a component of a vehicle power transfer system of the electrified vehicle.

17. The method as recited in claim 12, comprising:
receiving weather related data from a weather data server or data from a grid announcement server; and
predicting whether or not a power outage condition is likely based on the weather related data or the data from the grid announcement server.

18. The method as recited in claim 12, comprising:
determining whether the electrified vehicle is located at the structure;
determining whether the electrified vehicle is on-plug; and
pairing the electrified vehicle with the EVSE when the electrified vehicle is both located at the structure and is on-plug.

19. The method as recited in claim 18, comprising:
providing a visual alert when a status of the backup power readiness state changes.

20. The method as recited in claim 12, comprising:
determining whether the electrified vehicle is located at the structure; and
pairing the electrified vehicle with the EVSE when the electrified vehicle is not at the structure but is within a threshold distance from the structure.

\* \* \* \* \*